March 17, 1931. G. J. WRIGHT 1,796,974
REAR CURTAIN OPERATOR DEVICE
Filed Sept. 19, 1928    2 Sheets-Sheet 1
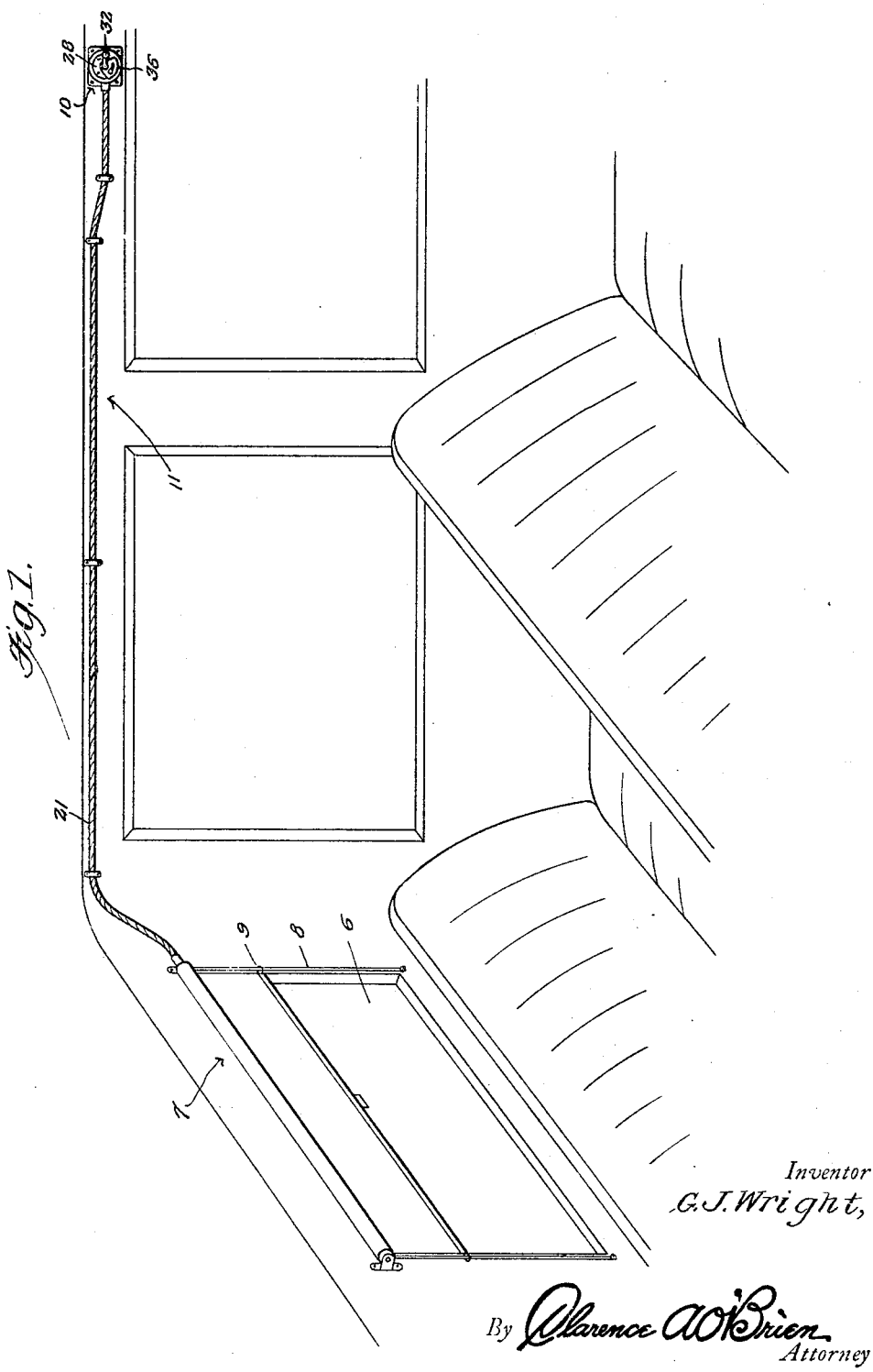
Inventor
G. J. Wright,
By Clarence A. O'Brien
Attorney March 17, 1931.  G. J. WRIGHT  1,796,974
REAR CURTAIN OPERATOR DEVICE
Filed Sept. 19, 1928    2 Sheets—Sheet 2
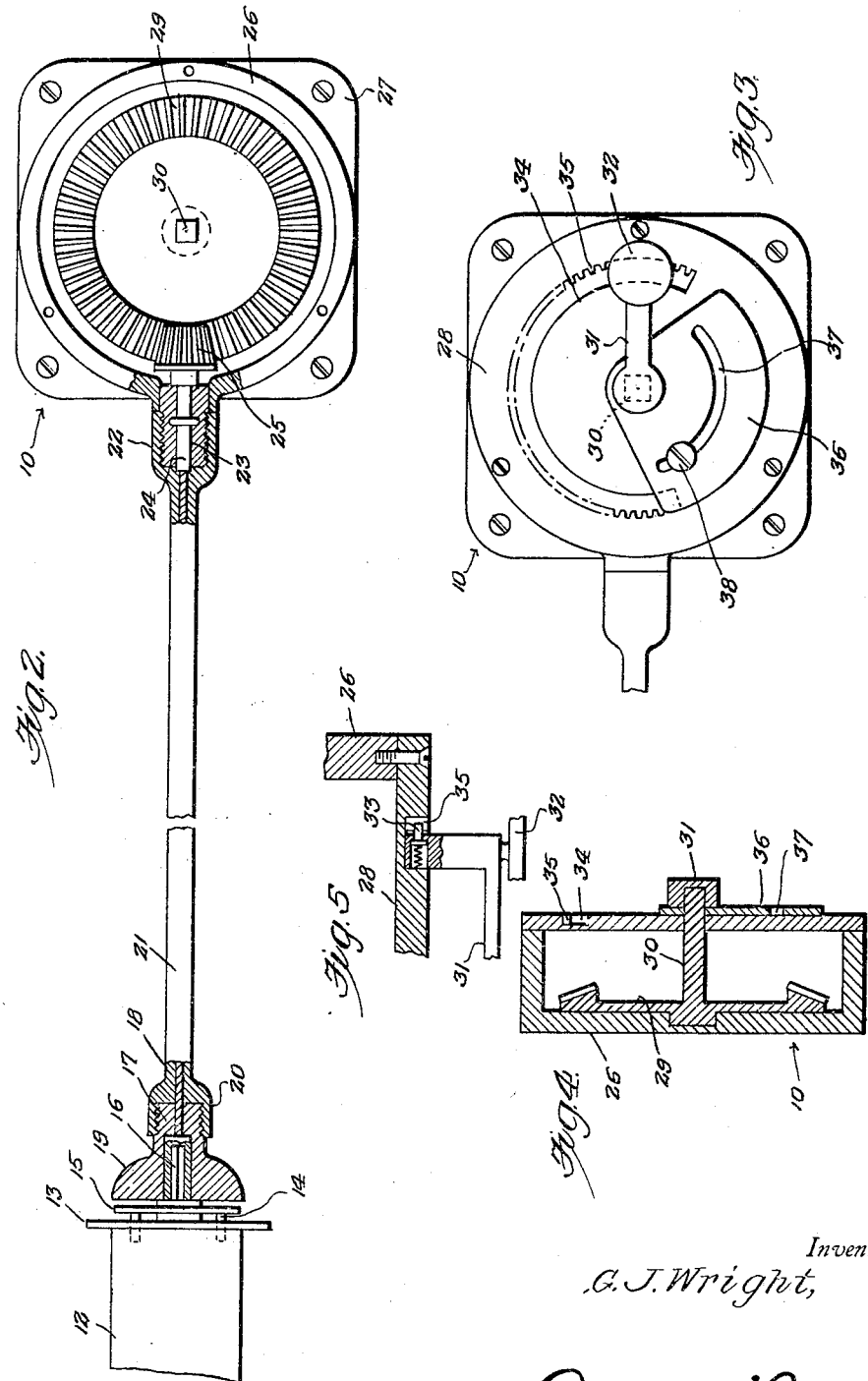

Patented Mar. 17, 1931

1,796,974

UNITED STATES PATENT OFFICE

GEORGE JOSEPH WRIGHT, OF BROOKLINE, MASSACHUSETTS, ASSIGNOR TO MARY WRIGHT, OF QUINCY, MASSACHUSETTS

REAR-CURTAIN-OPERATOR DEVICE

Application filed September 19, 1928. Serial No. 306,846.

This invention relates to new and improved devices designed for operating a rear curtain such as is used on the rear window light of automobiles, particularly of the closed car type, and it has more particular reference to the kind of device which permits operation by the driver in the front seat.

When driving at night time, it has been found advisable to keep the rear curtain down to prevent headlights of machines in the rear from shining through the rear window onto the windshield and rear view mirror. Careful drivers always drive with the rear curtains down to avoid accidents from this confusing source of illumination.

However, there are times that this works an inconvenience on the driver when he is in the car alone, because when he wants to park, it is advisable to have the curtain up. Thus, it is usually necessary to climb over the front seat or to reach over, to operate the curtain.

It follows that the purpose of this invention is to provide a mechanical contrivance for raising and lowering the rear curtain at the will of the driver according to conditions and to have the operating means for the device located within convenient reach of the driver in the front seat. An adjustable stop is provided for said operating means in order to limit the travel of the curtain to substantially the vertical dimension of the automobile rear window.

My principal aim in carrying out the invention is to provide a device of this class which is characterized by a novel arrangement of parts, so organized and cooperating as to render the device susceptible of convenient and dependable operation, and to permit it to fulfill the requirements of an invention of this class in a suitable manner.

Other features and advantages of the invention will become apparent from the following description and drawings.

In the drawings:—

Figure 1 is a perspective view of a fragmentary portion of the interior of an automobile showing the rear curtain and the operating device and the approximate place which is occupied.

Fig. 2 is a fragmentary detail view in section and elevation showing the construction of the principal parts more in detail.

Fig. 3 is a face or front elevational view of the gear casing.

Fig. 4 is a vertical section through the gear casing.

Fig. 5 is a fragmentary view of a portion thereof showing the pawl and rack means.

In the drawings 6 designates the rear window, 7, the roller curtain. The window is provided with vertical guide rods 8 and the curtain with guide eyes 9 slidable thereon. This permits the curtain to operate evenly and to maintain a desired taut condition. The operating means at the left hand end of the front seat is generally designated at 10, and the operating connection between this and the roller curtain is designated at 11.

As shown at the left in Fig. 2, the curtain includes a roller 12 having a head plate 13 on one end and provided with diametrically opposite sockets for reception of coupling pins 14 on a rotating disk 15. This disk is provided with an outstanding trunnion 16 which is preferably square in cross section. This trunnion fits into coupling socket 17 carried by a flexible operating shaft 18.

19 designates a bearing bracket which is threadably connected with a fitting 20 on one end of the shaft casing 21. The opposite end 22 of the casing is threaded upon a bushing 23 in which the bearing portion 24 of the opposite end of the flexible shaft is rotatable. On this end of the flexible shaft is a beveled pinion 25.

The pinion extends into the gear casing. The casing has a circular body portion 26 having attaching flanges 27 and a cover plate 28. Journaled for rotation in this casing is a large beveled gear 29, with which the pinion 25 meshes. This gear has a central stub shaft 30 extending through a central opening in the cover plate where it is operated by a hand crank 31 which is connected thereto.

The crank is located on the exterior of the cover plate and is provided with a finger grip 32 and the laterally directed end portion carrying a spring pressed pin 33 functioning as a latch. This detail is located in an arcuate slot 34 formed in the cover plate and one edge of the slot is provided with teeth 35 with which the latch is cooperable.

This retards the action of the crank as it is moved from one side to the other. Mounted on the shaft 30 and cooperable with the hand crank is a stop member consisting in the present instance of segmental plate 36 having a curved slot 37 cooperable with a retaining screw 38.

Turning the crank in one direction obviously rolls the curtain up and turning it in an obvious opposite direction, rolls the curtain down, during which time the pin 33 ratchets freely over the teeth 35, in the slot 34.

The crank can be stopped in any position by tightening the screw 38 against the plate 36, so that the curtain may be stopped in any desired position. Assuming that the rotation of the crank in a clockwise direction will unroll the curtain, the curtain roller is first uncoupled from the flexible shaft, the curtain rolled down by hand to cover the window, and the crank turned clockwise as far as it will go with its laterally-directed end portion which carries the pin 33 abutting the end of the arcuate slot 34 at the righthand side of Fig. 3, and then the roller is again coupled to said shaft. The crank is then rotated in a counter-clockwise direction until the curtain is rolled up sufficiently to uncover said window, whereupon the segmental plate 36 is brought against said laterally-extending end portion and locked in position by the screw 38. By this means the driver will be able to limit the travel of the curtain to substantially the vertical dimension of the automobile rear window without any overrunning of the curtain, and by virtue of the adjustment of the stop member, the device may be applied to windows of different heights. Similarly, if the anticlockwise rotation of the crank will unroll the curtain, the roller is first uncoupled and the curtain rolled up by hand to uncover the window, the crank is then turned to the limit of its clockwise movement with said laterally-directed end abutting the end of the arcuate slot 34 on the righthand side of Fig. 3 and the roller again coupled to said shaft. The crank is then turned counterclockwise until the curtain covers the window, whereupon said segmental plate 34 is brought up against the said laterally directed end and secured in position by the screw 38. Thus it will be seen that the lower righthand end of the arcuate slot 34 as viewed from the front of Fig. 3, constitutes a stop for said crank in one direction and the segmental plate 36, an adjustable stop, in the opposite direction. It is of course obvious that when the crank is returned, this operates the gear 29 which in turn operates the flexible shaft through the medium of the pinion 25. The flexible shaft, being coupled to the curtain, as shown in Fig. 2, serves to impart rotation to the curtain roller.

It is thought that by considering the description in connection with the drawings, a clear understanding of the construction, operation, and advantages of the invention will be had.

Minor changes in shape, size and rearrangement of parts coming within the field of invention claimed may be resorted to in actual practice if desired.

Having thus described my invention, what I claim as new is:—

1. In a rear curtain operating device of the class described, operating means adapted to be located within the vehicle within convenient reach of the automobile operator, and comprising a casing having a body portion provided with an attaching flange, a cover plate carried by the body portion, a beveled gear mounted for rotation in said casing, said gear being provided with a central stub shaft extending through a central opening in the cover plate, a hand crank carried by the projecting end of the stub shaft, a flexible shaft extending into said casing and provided with a bevel pinion in mesh with said bevel gear, a segmental slotted plate carried by said stub shaft and in movable contact with the exterior of said cover plate, and a retaining screw carried by the cover plate and cooperable with said slot for maintaining said segmental plate in different adjusted positions.

2. In a structure of the class described, a curtain roller, a flexible drive shaft, gearing for imparting rotation to said shaft, a coupling between the opposite end of the shaft and said curtain roller, said coupling comprising a disc, having diametrically-opposite pins fitting into sockets in an adjacent end of the curtain roller, said disc being provided with an outstanding polygonal trunnion, said flexible shaft having a coupling socket receiving said trunnion.

3. In a rear-curtain operating device of the class described, operating means adapted to be located within the vehicle within convenient reach of the automobile operator, and comprising a casing having a body portion provided with an attaching flange, and a cover plate carried by the body portion, a beveled gear mounted for rotation in said casing, said gear being provided with a central stub shaft extending through a central opening in the cover plate, a hand crank carried by the projecting end of the stub shaft, pawl and ratchet means associated with the cover plate and handle, and a flexible shaft extending into said casing and provided with a bevel pinion in mesh with said bevel gear.

4. An automobile rear-curtain operator device comprising in combination a rear window curtain roller, a flexible drive shaft, manually-operated means located within convenient reach of the driver for actuating said drive shaft, a coupling between one end of said shaft and said curtain roller, said coupling comprising a disc having pins fitting into sockets in an adjacent end of the curtain roller, and means operatively connecting said disc to said drive shaft.

In testimony whereof I affix my signature.

GEORGE JOSEPH WRIGHT.